US005505407A

United States Patent [19]
chiappetta

[11] Patent Number: 5,505,407
[45] Date of Patent: Apr. 9, 1996

[54] AIR-LAND VEHICLE

[75] Inventor: Frank R. chiappetta, Berwyn, Pa.

[73] Assignee: Fran Rich Chi Associates, Berwyn, Pa.

[21] Appl. No.: 118,966

[22] Filed: Sep. 9, 1993

[51] Int. Cl.$^6$ .............. B64C 29/00; B64C 27/82
[52] U.S. Cl. .............. 244/2; 244/50; 244/23 C; 244/23 D; 244/17.21; 244/12.5
[58] Field of Search ............... 244/2, 50, 23 C, 244/23 D, 12.1, 12.5, 17.17, 17.19, 17.21

[56] References Cited

U.S. PATENT DOCUMENTS

| | | | |
|---|---|---|---|
| 1,296,631 | 3/1919 | Davis | 244/12.1 |
| 1,786,576 | 12/1930 | Nelson . | |
| 2,514,822 | 7/1950 | Wolfe, Jr. | 244/2 |
| 2,923,494 | 2/1960 | Strong | 244/2 |
| 3,101,919 | 8/1963 | Madon | 244/2 X |
| 3,156,434 | 11/1964 | Harrington . | |
| 3,253,806 | 5/1966 | Eickmann . | |
| 3,265,329 | 8/1966 | Postelson | 244/2 |
| 3,276,528 | 10/1966 | Tucknott et al. | 244/2 X |
| 3,405,890 | 10/1968 | Eickmann . | |
| 3,494,575 | 2/1970 | Budworth | 244/2 |
| 3,628,755 | 12/1971 | Nagler . | |
| 4,071,207 | 1/1978 | Piasecki et al. | 244/12.5 X |
| 4,161,843 | 7/1979 | Hui . | |
| 4,173,321 | 11/1979 | Eickmann . | |
| 4,768,737 | 9/1988 | Broadley . | |
| 4,828,205 | 5/1989 | Durand . | |
| 5,115,996 | 5/1992 | Moller | 244/12.5 |
| 5,141,173 | 8/1992 | Cay | 244/2 |

FOREIGN PATENT DOCUMENTS 846300 8/1960 United Kingdom .............. 244/12

*Primary Examiner*—Andres Kashnikow
*Assistant Examiner*—Virna Lissi Mojica
*Attorney, Agent, or Firm*—William H. Meise

[57] ABSTRACT

A flying vehicle has wheels for highways, and a body and an engine. The body, engine and load define a center of mass (CG). Shrouded fans are located about the CG so as to produce, in conjunction with air jet redirection apparatus, the torques required to assume various attitudes. In one embodiment, an upper shrouded fan, with a diameter no greater than eight feet, produces an air jet, centered above the CG, for lifting the body. A second shrouded fan, smaller than the first, produces an air jet for lift, centered below the center of mass, on the longitudinal axis of the vehicle, forward of the CG. Third and fourth paired shrouded fans produce air jets for lift, centered below the CG, on either side of the longitudinal axis of the vehicle, toward the rear of the body. The paired second and third fans have equal diameters, no greater than half of the diameter of the upper fan, to keep the total width eight feet. The engine is coupled to the fans during flight, for driving them at speeds which are in a mutually fixed ratio, with the rotation direction of the upper fan contrary to the directions of rotation of the other three, whereby rotational moments are substantially canceled. Movable flap arrangements are coupled to the shrouded fans, for redirecting the air jets, for providing directional forward, aft, left, and right translation, and rotation motions, and pitch and roll attitudes.

16 Claims, 14 Drawing Sheets

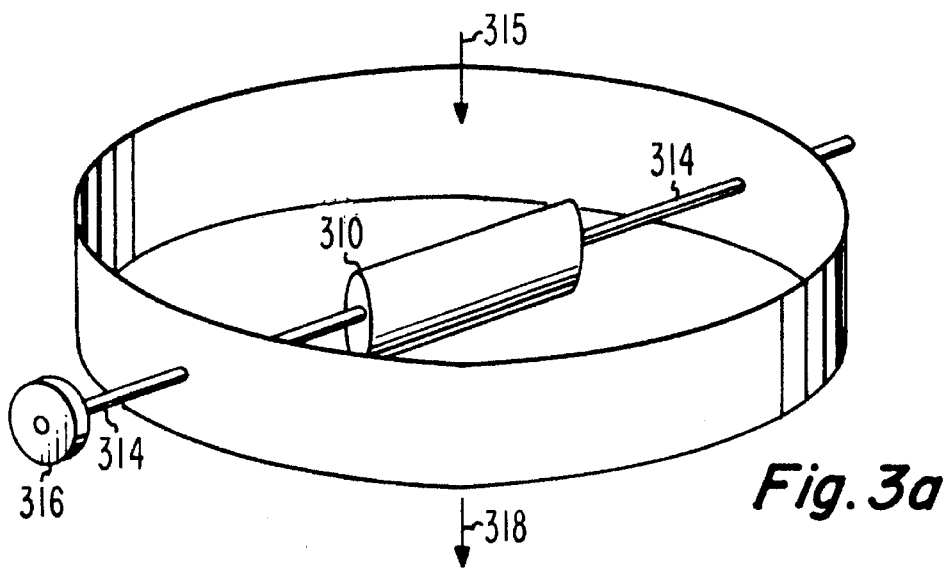
Fig. 3a
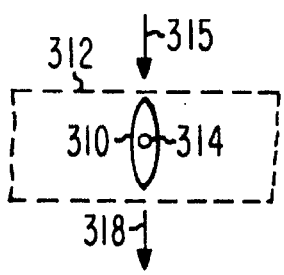
Fig. 3b
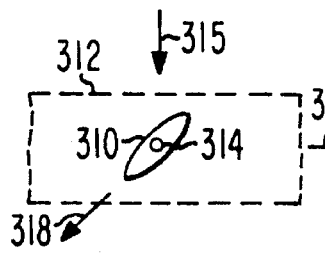
Fig. 3c
Fig. 3d
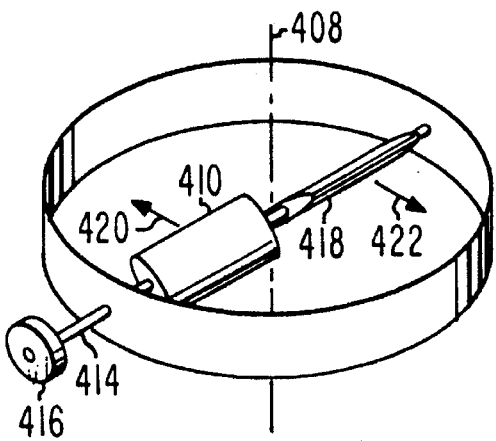
Fig. 4a
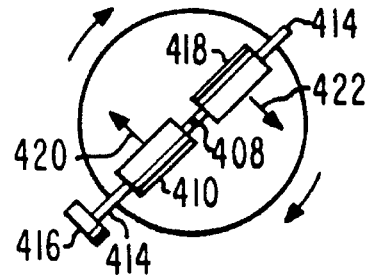
Fig. 4c
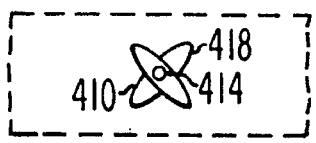
Fig. 4b

| TRANSLATION FORWARD | | | | | | | |
|---|---|---|---|---|---|---|---|
| FAN A | | B | | C | | D | |
| F2 | 4 | 2 | 4 | 2 | 4 | 2 | 4 |
| ▷ | ▷ | ▷ | ▷ | ▷ | ▷ | ▷ | ▷ |

| TRANSLATION AFT | | | | | | | |
|---|---|---|---|---|---|---|---|
| FAN A | | B | | C | | D | |
| F2 | 4 | 2 | 4 | 2 | 4 | 2 | 4 |
| ◁ | ◁ | ◁ | ◁ | ◁ | ◁ | ◁ | ◁ |

| TRANSLATION LEFT | | | | | | | |
|---|---|---|---|---|---|---|---|
| FAN A | | B | | C | | D | |
| F1 | 3 | 1 | 3 | 1 | 3 | 1 | 3 |
| △ | △ | △ | △ | △ | △ | △ | △ |

| TRANSLATION RIGHT | | | | | | | |
|---|---|---|---|---|---|---|---|
| FAN A | | B | | C | | D | |
| F1 | 3 | 1 | 3 | 1 | 3 | 1 | 3 |
| ▽ | ▽ | ▽ | ▽ | ▽ | ▽ | ▽ | ▽ |

| TURN (ROTATION) TO LEFT | | | | | | | |
|---|---|---|---|---|---|---|---|
| FAN A | | B | | C | | D | |
| V1 | 3 | 1 | 3 | 1 | 3 | 1 | 3 |
| △ | ▽ | △ | ▽ | △ | ▽ | △ | ▽ |

| TURN (ROTATION) TO RIGHT | | | | | | | |
|---|---|---|---|---|---|---|---|
| FAN A | | B | | C | | D | |
| V1 | 3 | 1 | 3 | 1 | 3 | 1 | 3 |
| ▽ | △ | ▽ | △ | ▽ | △ | ▽ | △ |

| ROLL TO LEFT | | | | | | | |
|---|---|---|---|---|---|---|---|
| FAN A | | B | | C | | D | |
| V1 | 3 | 1 | 3 | 1 | 3 | 1 | 3 |
| ▽ | ▽ | △ | △ | ▽ | ▽ | ▽ | ▽ |

| ROLL TO RIGHT | | | | | | | |
|---|---|---|---|---|---|---|---|
| FAN A | | B | | C | | D | |
| V1 | 3 | 1 | 3 | 1 | 3 | 1 | 3 |
| △ | △ | ▽ | ▽ | △ | △ | △ | △ |

| PITCH DOWN | | | | | | | |
|---|---|---|---|---|---|---|---|
| FAN A | | B | | C | | D | |
| V2 | 4 | 2 | 4 | 2 | 4 | 2 | 4 |
| ◁ | ◁ | ▷ | ▷ | ◁ | ◁ | ◁ | ◁ |

| PITCH UP | | | | | | | |
|---|---|---|---|---|---|---|---|
| FAN A | | B | | C | | D | |
| V2 | 4 | 2 | 4 | 2 | 4 | 2 | 4 |
| ▷ | ▷ | ◁ | ◁ | ▷ | ▷ | ▷ | ▷ |

*Fig. 6d*

AIR-LAND VEHICLE

This invention relates to vehicles adapted for both flight and ordinary automotive use, and more particularly to a vehicle having driven wheels for use on land, and having louvered shrouded fans for flying.

BACKGROUND OF THE INVENTION

Autogyro aircraft, in which a vehicle has helicopter-like airfoils rotated by the forward motion of the vehicle, have been known and used for many years, but have the disadvantage, much like an airplane, that flight must be preceded by a roll to achieve flight velocity. Helicopters are more often used, because takeoff may be accomplished from a fixed position. A great deal of attention has been directed toward a vehicle which is convertible for operation as both an automobile and a helicopter, as described, for example, in U.S. Pat. No. 4,173,321, issued Nov. 6, 1979 in the name of Eickmann. In order to function acceptably as an automobile on land, the vehicle must have an overall width no greater than eight feet, corresponding to the greatest width for which highways are currently designed, as recognized in the above-mentioned Eickmann patent, although the exact maximum dimension varies from state to state, and may differ in foreign jurisdictions. Various schemes have been proposed, none of which has resulted in widespread use of such vehicles. A simple air-land vehicle is desired.

SUMMARY OF THE INVENTION

A multifunction vehicle adapted for use carrying a load on highways and in flight includes a body supporting an engine, with the body defining a longitudinal axis parallel to a preferred direction of travel. The body and engine, together with a standard load, define a center of mass. The preferred direction of travel, the longitudinal axis and the center of mass together define forward and rearward portions of the body relative to the center of mass. In accordance with the invention, shrouded fans are located about the center of mass in such a fashion as to produce, in conjunction with air jet redirection apparatus, the desired torques about the center of mass required to assume various attitudes. In a particular embodiment of the invention, a first shrouded fan is coupled to the body for, in a first (flying) mode of operation, producing an air jet for providing lift to the body. The center of lift of the first shrouded fan lies in a body-bisecting vertical plane which includes the longitudinal axis, and also lies above the center of mass. The first shrouded fan has an overall diameter of eight feet or less to fit onto a highway without folding. The shroud enhances lift, and provides protection against damage to the fan and against personal injury. A second shrouded fan is coupled to the body for, in the first (airborne) mode of operation, producing an air jet for providing lift to the body. The center of lift of the second shrouded fan is located below the center of mass and in the body-bisecting plane, and at a longitudinal position which may be either forward or rearward of the center of mass, but which in the particular embodiment is forward of the center of mass. The second shrouded fan has a diameter less than that of the first shrouded fan. Third and fourth shrouded fans are coupled to the body for, in the first mode of operation, producing air jets for providing lift to the body. The third and fourth shrouded fans are symmetrically disposed relative to the body-bisecting vertical plane, and the combined center of lift of the third and fourth shrouded fans is located in the body-bisecting vertical plane at a longitudinal position which is on the other side of the center of mass from the second shrouded fan, which in the particular embodiment is rearward of the center of mass. The second and third shrouded fans have equal diameters, each of which is no greater than half of the diameter of the first shrouded fan. In the particular embodiment, a drive coupler couples an engine pair to the first, second, third and fourth shrouded fans, for, in the first mode of operation, driving them at rates of revolution which are in a fixed ration to the rate of revolution of the engine, with the rotation direction of the first shrouded fan contrary to the directions of rotation of the second, third and fourth shrouded fans, whereby the moments produced in one rotational direction by the first shrouded fan are substantially canceled by the moments produced by the combination of the second, third and fourth shrouded fans. Controllable vane arrangements are coupled to at least some of the shrouded fans for controllably redirecting the air jets, for, in the first mode of operation, providing thrust control in at least two directions. A plurality of support wheels are provided, at least one of which is controllably coupled to the engine for being driven in a second (land or terrestrial) mode of operation, and one of which is controllable for steering when the vehicle is in the second mode of operation.

DESCRIPTION OF THE DRAWINGS

FIG. 3a is a perspective or isometric view of a movable vane in a shroud, to aid in understanding how vane position affects the air jet, and FIGS. 3b, 3c and 3d are side views which illustrate the air jet direction in response to various vane positions, and the directions of the forces resulting therefrom;

FIG. 4a is a perspective or isometric view of a pair of movable vanes in a shroud, to aid in understanding how vane position affects the air jet, FIG. 4b is an elevation view along the axis of the hinge actuation and support shaft, and FIG. 4c is a view thereof illustrating the direction of rotational force imparted by the vanes in the positions illustrated in FIGS. 4a and 4b;

DESCRIPTION OF THE INVENTION

Figure 1:
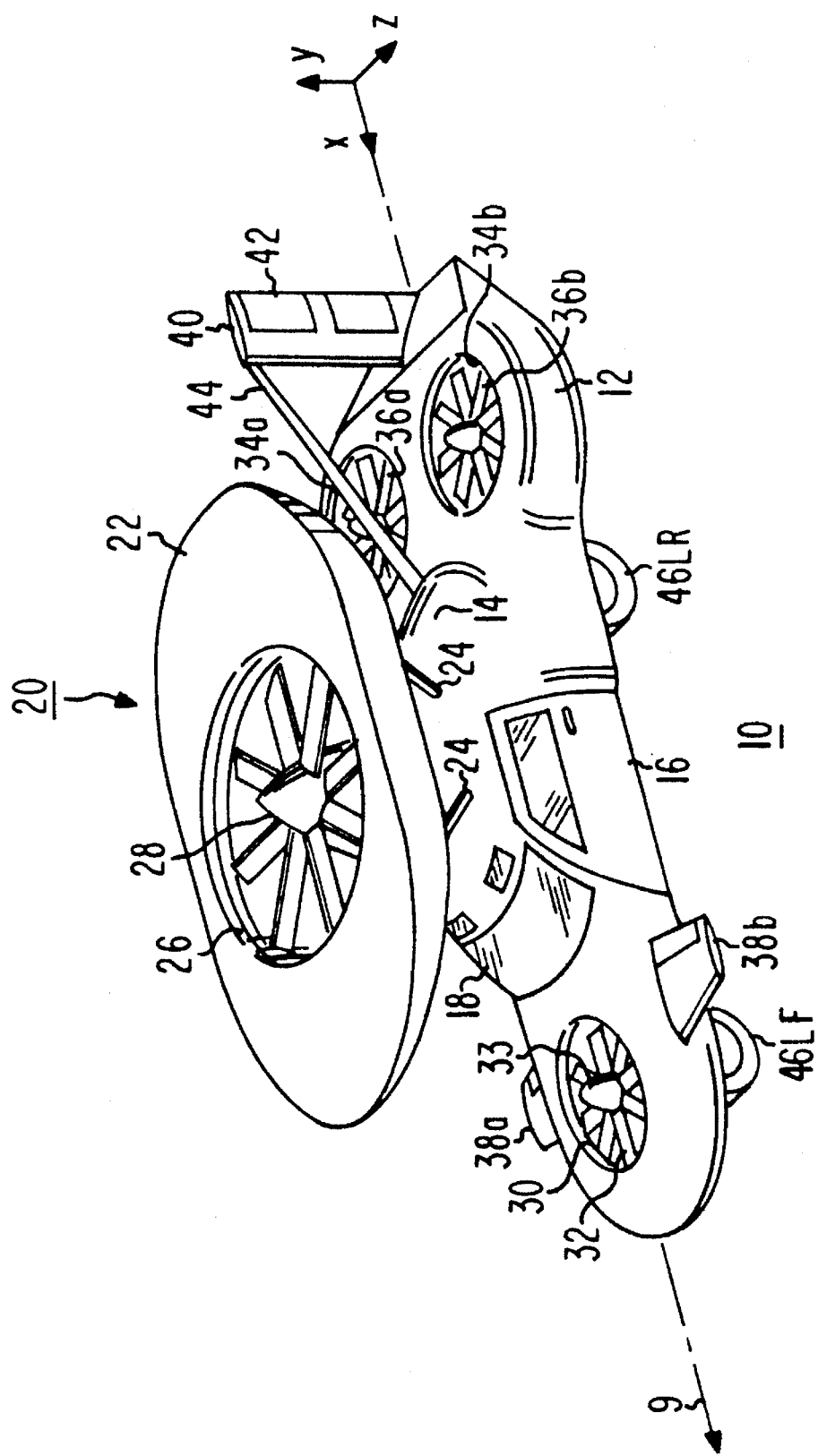
FIG. 1 is a simplified perspective or isometric view of a vehicle according to the invention.
Figure 2A:
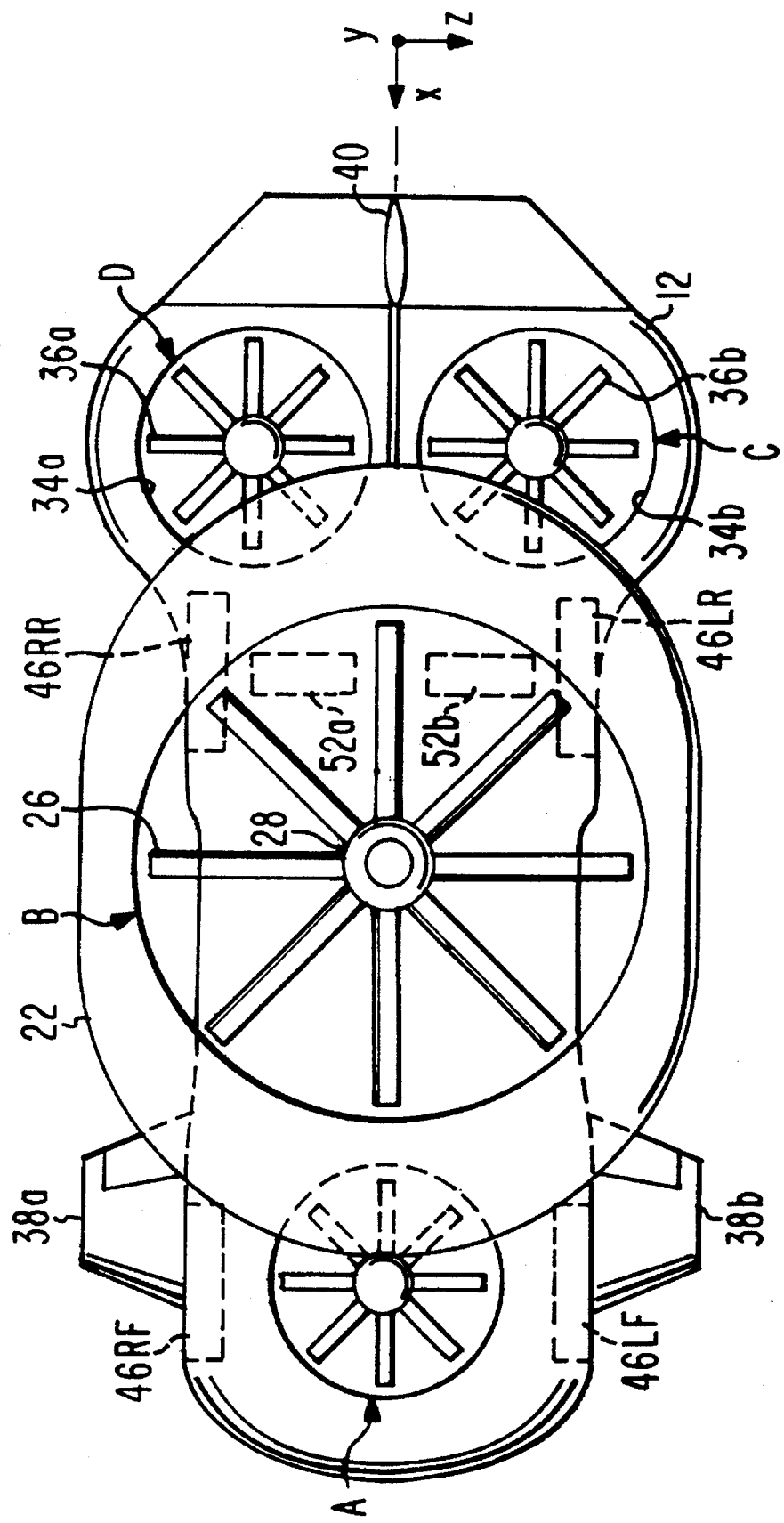
FIG. 2a is a simplified plan view of the vehicle of FIG. 1.
Figure 2B:
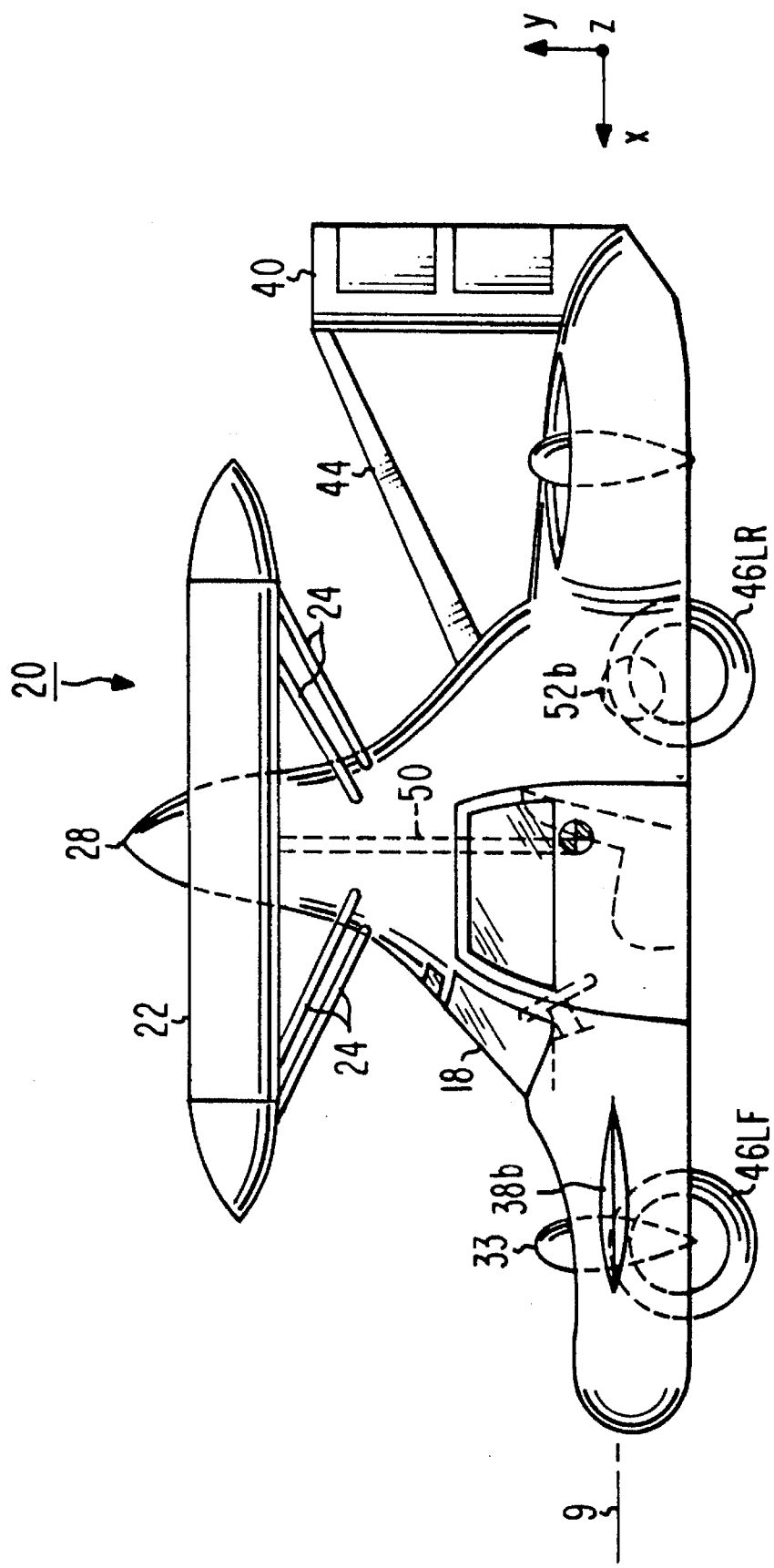
FIG. 2b is an elevation view thereof.
Figure 2C:
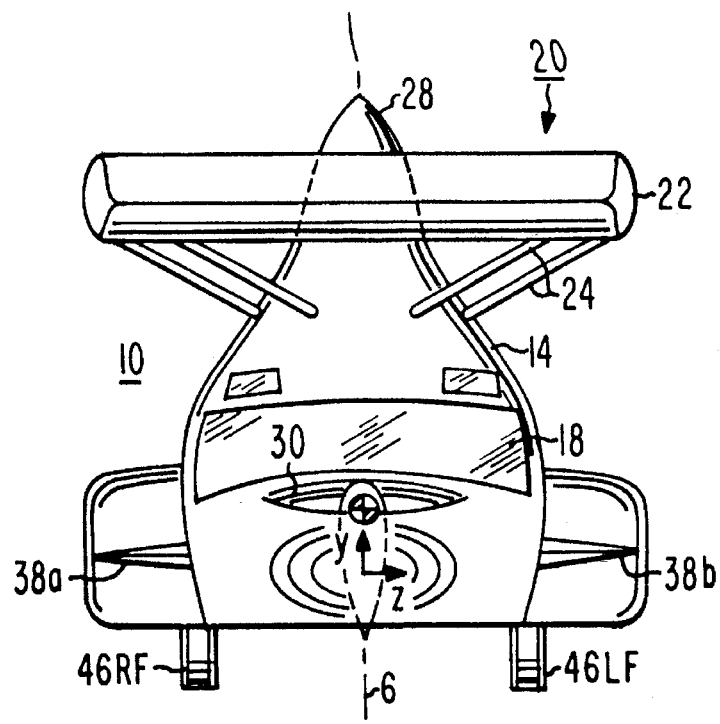
FIGS. 2c and 2d are corresponding front and rear views, respectively.
Figure 2D:
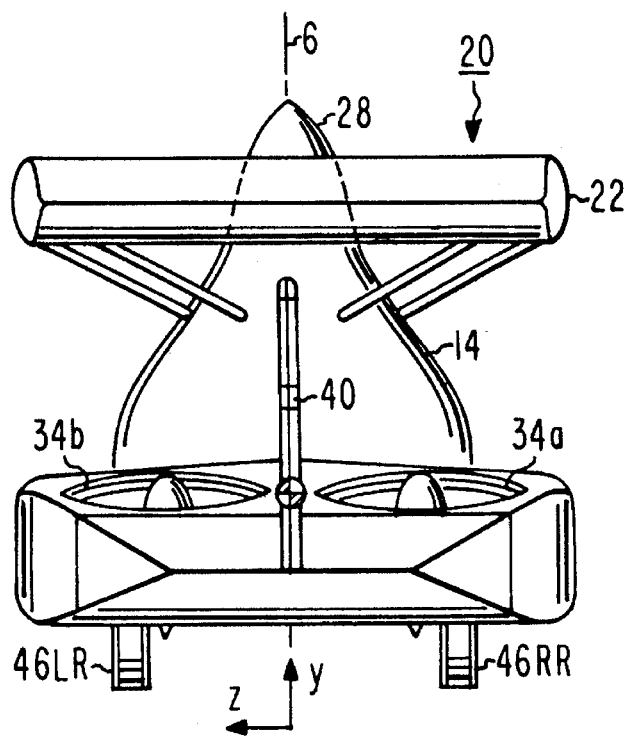

In FIGS. 1, 2a, 2b, 2c, and 2d, an air-land vehicle 10 includes a body 12, which has an aerodynamic shape. Body 12 is generally symmetrical about a body-bisecting vertical x–y plane, illustrated a 6 in FIGS. 2c and 2d. A top 14 covers the load-bearing portion of body 12, and a door 16 provides access to the interior. A windshield 18 allows vision in the preferred direction of motion (x), indicated by an arrow 9. A shroud 22 of a first or upper shrouded fan 20 is supported above body 12 by struts designated 24. An eight-bladed fan 26 lies within the window defined by shroud 22, and is affixed to a hub 28. Hub 28 is driven by a vertical shaft 50 extending through roof 14, and the shaft is ultimately driven by a pair of General Electric Co. POWERCORE engines, or their equivalents, 52a, 52b coupled through a transmission or transaxle arrangement (not illustrated in FIGS. 1, 2a, 2b and 2c). In order for vehicle 10 to fit onto a conventional highway in a land travel mode of operation, the diameter of fan 26 is 80.0 inches, corresponding to 6.6 feet, and the lateral dimension (parallel to the z axis) of shroud 22 is 94 inches, corresponding to 7.83 feet, which is less than the typical eight-foot maximum highway dimension. Fan 26 rotates clockwise (as seen from above). The longitudinal dimension (parallel to the x axis) of shroud 22 is larger than the lateral dimension solely to aid in forming an aerodynamic morphology for the forward direction of travel.

The center of mass or center of gravity (CG) of body 12 of FIGS. 1, 2a, 2b, 2c, and 2d lies approximately beneath hub 28 of shrouded fan 20, and approximately in the x–y plane, although the location of the CG may vary somewhat, depending upon the mass and the location of the payload. Body 12 defines a duct 30 forward of the center of gravity, which accommodates a second or forward ducted fan 32. A pair of canard-type aerodynamic surfaces 38a, 38b are affixed to the sides of body 12 at locations forward of the center of gravity. A rearward pair of further ducts 34a, 34b is defined by body 12 at locations symmetrically disposed on either side of the x–y plane, and aft of the center of gravity. Ducts 34a and 34b accommodate fans 36a and 36b, respectively. The fans of ducted fans 32, 34a and 34b are identical, and have eight blades with diameters of 38 inches. Fans 32, 34a and 34b rotate counterclockwise as seen from above, with a net rotational momentum selected to cancel the rotational momentum of upper fan 20.

In FIGS. 1, 2a, 2b, 2c, and 2d, a vertically-projecting stabilizer 40 is supported by body 12 near the rear of vehicle 10. Movable portions 42 of stabilizer 40 act as conventional aircraft rudder elements. A strut 44 provides support for the upper end of stabilizer 40. A left front wheel 46LF and a left rear wheel 46LR visible in FIG. 1 are of conventional automotive type, adapted for highway and possibly some off-highway use. The corresponding right front wheels are designated 46RF and 46RR, respectively.

According to an aspect of the invention, the fan blades are rigidly affixed to their hubs, so that no complex mechanisms are necessary for varying the pitch angle of the blades to vary the thrust. Instead, the maximum available thrust is controlled by control of the engine speed, which in turn is directly related to the fan speeds, because the fan drives are mechanically ganged or fixedly coupled in a particular rotational ratio to the engines and to each other. However, rapid maneuvering may require rapid changes in net thrust, which, if derived solely from engine speed, might result in delays as a result of engine inertia, which tends to resist speed variations in response to control of the throttle or speed setting. Instead, net thrust can be quickly controlled by a set of vanes associated with each fan, including large upper fan 20.

FIG. 3a is a view of a movable vane or flap set in a shroud 312, and held in place by a rotatable actuation and support shaft 314 against the forces exerted by an input or incoming air flow in the direction of arrow 315. Shaft 314 passes through the side of shroud 312, and may be rotated remotely by means of a cable (not illustrated) passing over a pulley 316, which thereupon results in rotation of vane 310. The direction of the output air flow or air jet in the vicinity of vane 310 is indicated by an arrow 318. FIG. 3b is a side view of the arrangement of FIG. 3a, with shaft 314 rotated to a neutral position, in which vane 310 does not change the direction of outgoing airflow 318 relative to incoming airflow direction 315. This neutral position of vane 310 therefore results in no forces. FIG. 3c illustrates the result of clockwise rotation of pulley 316, with a corresponding rotation of vane 310. As illustrated in FIG. 3c, the air jet direction is modified, and is redirected toward the left, which results in a net force on the vane, and on the shroud to which it is affixed, which is directed to the right, orthogonal to the axis of shaft 314, as suggested by arrow 320. Similarly, in FIG. 3d, the outgoing air jet direction 318 is modified to flow to the right, resulting in a force to the left, perpendicular to shaft 314, as suggested by arrow 322. Thus, a vane in a shrouded fan can be used to create lateral forces which act on the shroud.

FIGS. 4a, 4b, and 4c illustrate two vanes 410 and 418 mounted on a common support shaft 414, on opposite sides of shroud axis 408. Each of vanes 410 and 418 is independently rotatable about shaft 414, and in the positions illustrated in FIGS. 4a and 4b, they produce forces in the directions indicted by arrows 420 and 422, which are in the same clockwise direction about axis 408, and which therefore result in a rotational force, which force tends to rotate the supporting shroud clockwise as seen from the top, as illustrated in FIG. 4c. Naturally, if the relative directions of vanes 410 and 418 were reversed, the direction of the rotational force would be revered. Thus, pairs of oppositely-controlled vanes associated with a shrouded fan can produce rotational forces.

Figure 5A:
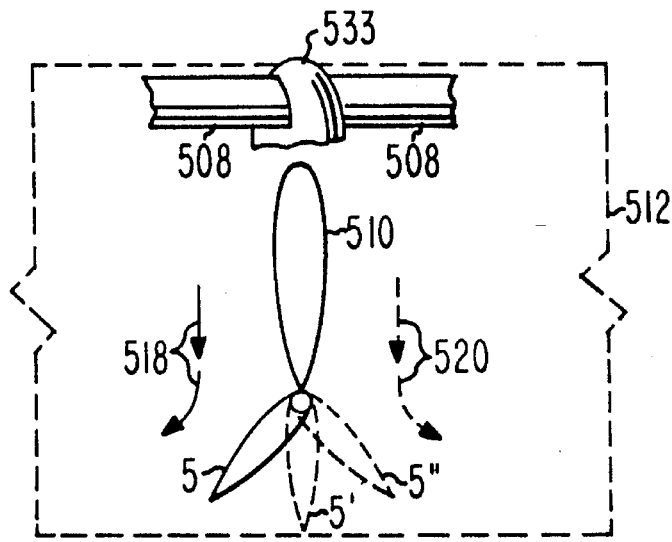
FIG. 5a is a side elevation view of a fixed vane with a movable flap, to illustrate the effects of movement of the flap.

FIG. 5a is a side elevation view of the edge of a fixed vane 510 located in a shroud 512 below a fan, part of which is illustrated as 508. A movable flap 5 is affixed to the lower edge of vane 510 by a hinge actuation and support shaft 516, so that flap 5 can take the positions illustrated as 5' and 5". Fixed vane 510 guarantees that the air jet produced by the fan is initially directed downward, without any rotations or deflections. In neutral position 5', the flap does not deflect the air stream, and creates no directional forces. In the illustrated position of flap 5, the air jet is directed laterally to the left, as suggested by arrow 518, while in position 5", the air jet is directed to the right, as indicated by dashed arrow 520. The redirection of the airstream by the flap results in forces which act against the flap supports, which may be viewed as being the shroud.

Figure 5B:
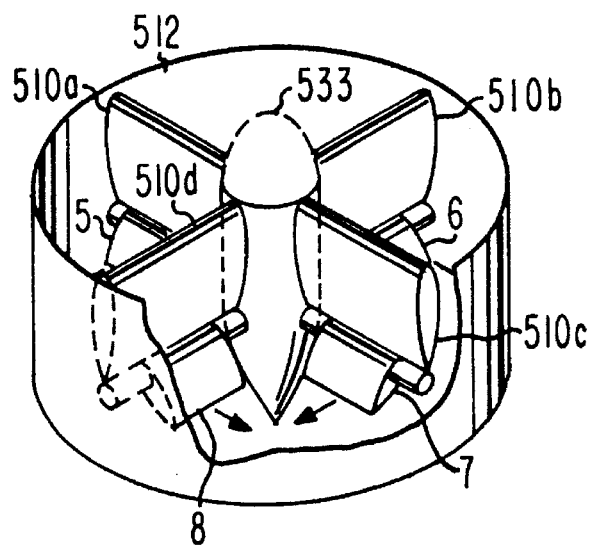
FIG. 5b is a simplified perspective or isometric view, partially cut away to reveal interior details, of a shroud including four fixed vanes with flaps positionable for reduction of lift without imparting directional thrust.
Figure 5C:
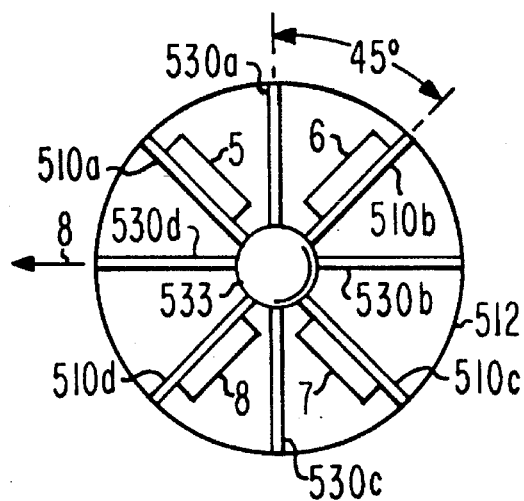
FIG. 5c is a plan view of a shroud with the four vanes and flaps of FIG. 5b, and with an additional four vanes/flap arrangements for directional control.

FIGS. 5b and 5c illustrate a portion of shroud 512 of FIG. 5a, with four fixed vanes 510a, 510b, 510c and 510d equally spaced about the center, supported by the shroud at the outer end of each vane, and at the center by a streamlined central housing 533. The fan blades are not illustrated, to avoid cluttering the FIGURES. Each fixed vane 510 of FIGS. 5b and 5c is fitted with a corresponding flap 5, 6, 7 and 8, respectively, each of which is capable of assuming positions ranging from a neutral position corresponding to 5' of FIG. 5a to either deflected position 5 or to deflected position 5". Movable flaps 5, 6, 7 and 8 are arranged in pairs. As illustrated, movable flaps 5 and 6 of a first pair are turned toward each other, and movable flaps 7 and 8 of a second pair are turned toward each other. In the illustrated positions of movable flap pairs 5, 6; 7, 8, each flap of a pair deflects the air jet toward the other flap of the pair, creating countervailing rotational forces. Thus, positioning the flap pairs in the illustrated manner does not generate a translational force or rotational moment, but instead merely tends to "close off" a portion of the air jet orifice, to thereby reduce the lift-generating air jet. The result may also be viewed as deflecting two equal portions of the air jet laterally, in opposite directions, so that the deflected portion does not contribute to lift, but so that the lateral forces of one of the two laterally deflected portions are offset by the lateral forces of the other of the laterally deflected portions. However it is viewed, the result is to reduce the lift generated by the air jet, without producing any translational or rotational forces on the structure. The most desirable arrangement is to move flaps 5–8 (where the hyphen, in this context, represents the word "through") in quads (all four together) for each shrouded fan, so that the maximum amount of thrust or lift control can be achieved.

FIG. 5c also illustrates four fixed vanes 530a, 530b, 530c and 530d, equally spaced about shroud 512, between fixed vanes 510a, 510b, 510c, and 510d. Each fixed vane 530a, 530b, 530c and 530d is fitted with a movable flap similar to flaps 514 associated with vanes 510, but capable of being positioned in any position between positions corresponding to positions 5 and 5" of FIG. 5a, including the neutral position. In FIG. 5c, the movable flaps associated with vanes 530a, 530c and 530d are in their neutral positions, and are not visible. The additional movable flaps are used for directional and positional control of the vehicle, as described below.

Figure 6B:
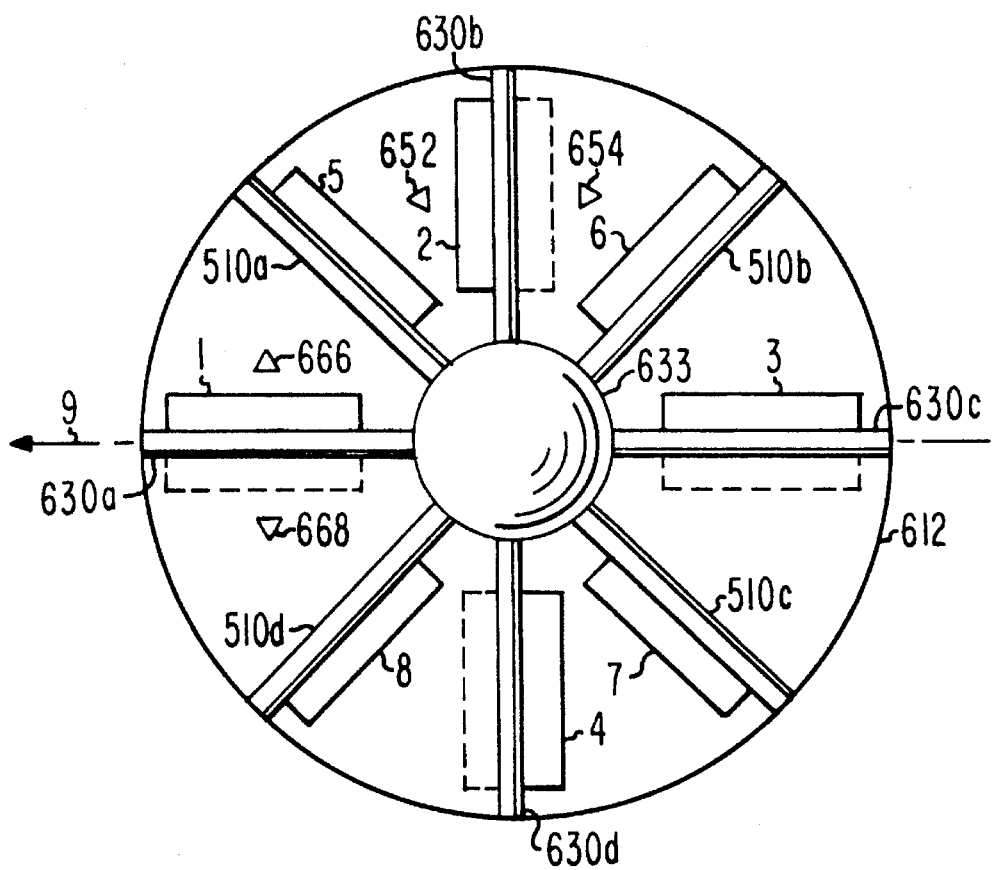
FIG. 6b is a simplified plan view of the arrangement of FIG. 6a, providing designations for the directions in which the flaps may be positioned.
Figure 6A:
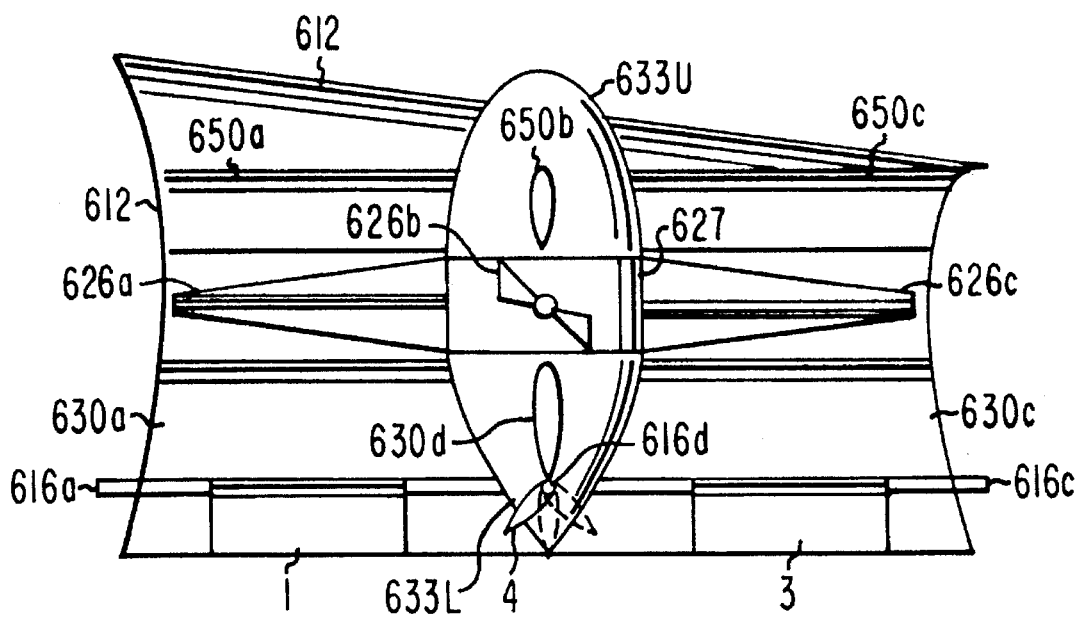
FIG. 6a is a simplified side elevation view of a representative shrouded fan with some of its vanes and movable flaps.
Figure 6C:
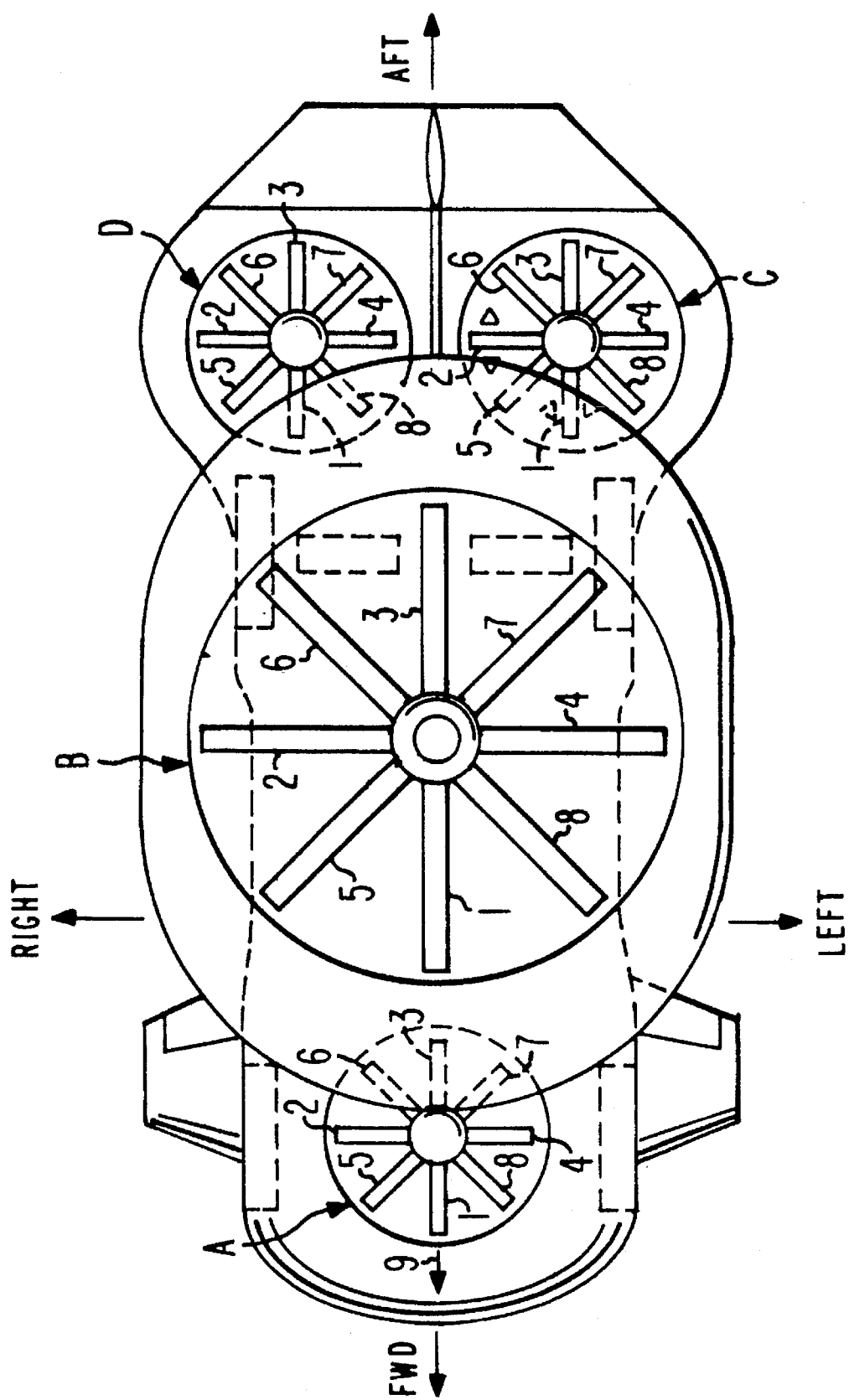
FIG. 6c is a plan view of the vehicle, similar to the plan view of FIG. 2a, with designations of the fans and of the vanes and flaps, and FIG. 6d tabulates the positions of the flaps of the fans for various vehicle attitudes and motions.

FIGS. 6a, 6b, 6c and the tabulations of FIG. 6d together define the positions assumed by the movable flaps of the various shrouded fans of the vehicle for various motions. FIG. 6a is a side elevation view of a representative shrouded fan of FIG. 1, partially cut away to reveal interior details, and FIG. 6b is a plan view of the vanes of the structure of FIG. 6a. In FIG. 6a, a fan blade support structure includes a streamlined housing including an upper portion 633U and lower portion 633L, which housing is supported by four fixed vanes affixed to the shroud 612; fixed support vanes 650a, 650b, 650c, are visible in FIG. 6a. Below fixed support vanes 650, some of the fan blades are illustrated as 626a, 626b, and 626c. Fan blades 626 are affixed to a rotational hub 627, driven as described below, and flush with streamlined housing 633. Also visible in FIG. 6a are three fixed vanes 630a, 630c, and 630d extending between shroud 612 and lower portion 633L of the streamlined central structure, and their associated movable flaps 1, 3 and 4 hinged or rotatable about actuation and support shafts or rods 616a, 616c, and 616d, respectively. FIG. 6b is a plan view of a portion of the structure of FIG. 6a, including numerical designations of each of the movable flaps for use in conjunction with the tabulations of FIG. 6d. In FIG. 6b, movable flap 1 extends from central structure 633 in the forward direction indicated by axis 9, and flap 3 extends rearward. Flaps 2 and 4 extend laterally from direction of motion 9. Flaps 1, 2, 3 and 4 are capable of assuming any of the positions illustrated as 5, 5' and 5" in FIG. 5a, and therefore movable flaps 2 and 4 of FIG. 6b are capable of assuming positions suggested by forward (◄) and aft (►) arrows 652 and 654, respectively. Similarly, movable flaps 1 and 3 are capable of assuming the positions represented by right (▲) and left (▼) directed arrows 666 and 668, respectively. In FIG. 6b, the direction-controlling flaps are designated 1, 2, 3 and 4, and the lift-negating flaps are designated 5, 6, 7 and 8, with 5, 6 representing one coacting pair, and 7, 8 the other coacting pair. Referring now to FIG. 6c, the vehicle is seen in top plan view, with each of the vanes designated 1 through 8 to correspond to the associated flap, and with the forward shrouded fan designated A, the upper shrouded fan designated B, the left rear shrouded fan designated C, and the right rear shrouded fan designated D.

FIG. 6d tabulates the positions of the movable flaps of FIG. 6c for various motions. Under the heading TRANSLATION FORWARD, the illustrated arrow directions for flaps (F) 2 and 4 associated with fans A, B, C and D are ►for all flaps, indicating that, for forward motion of the vehicle, flaps 2 and 4 of all four shrouded fans should be in the position indicated by arrow 654 of FIG. 6b. This position deflects the air jet in a direction with a component to the rear, thereby providing a reaction force on the vehicle which tends to translate the vehicle in a forward direction. Similarly, for TRANSLATION AFT or rearward motion of the vehicle, FIG. 6d indicates that all the flaps 2 and 4 of shrouded fans A, B, C, and D should be in the ◄position, corresponding to the position indicated by arrow 652 of FIG. 6b. Such a positioning of the flaps deflects the air jets of all the fans in a direction with a forward component, thereby providing a reaction force in a rearward direction, providing motion, or at least a force, in the desired rearward direction. From FIG. 6d, TRANSLATION LEFT requires that flaps 1 and 3 of all four fans assume the ▲ position, corresponding to the position indicated by arrow 666 of FIG. 6b, in which position the air jet is deflected to the right, providing a reaction force to the left. In a corresponding manner, FIG. 6d indicates that for TRANSLATION RIGHT, flaps 1 and 3 should all assume the ▼ position, which deflects the air jet to the left as indicated in FIG. 6b, providing a reaction force to the right.

More complex motions are also available by suitable control of the flaps. From FIG. 6d, a TURN LEFT, or a turn or rotation of the vehicle to the left, roughly about its center of gravity, is accomplished by controlling flaps 1 and 3 in opposite directions, with all flaps 1 set in the ▲ position, and all the flaps 3 in the ▼ position, which by reference to FIG. 6b indicates that flap 1 deflects the jet "upward", and flap 3 "downward", creating a set of reaction forces which tend to cause a counterclockwise rotation of the vehicle, corresponding to a left rotation or turn. Similarly, from FIG. 6d, a TURN RIGHT is accomplished by controlling flaps 1 and 3 of all the fans in mutually opposite directions, with flaps 1 in the ▼ position, and flaps 3 in the ▲ position, to thereby create rotational moments which tend to cause the desired vehicle rotations. As tabulated in FIG. 6d, a ROLL TO LEFT is accomplished by directing flaps 1 and 3 of the three lower fans A, C and D in the ▼ position, and flaps 1 and 3 of upper fan B in the ▲ position, which causes the three fans below the center of gravity to push the air jet to the left, to thereby produce a reaction force to the right on the vehicle, and which also causes the large upper fan, above the center of gravity, to push the air jet to the right, to create a force on the vehicle to the left. The combination of the force to the left at a location above the center of mass and the force to the right at a location below the center of mass creates a roll moment, which results in a roll to the left. A corresponding ROLL TO the RIGHT is accomplished by adjusting the positions of flaps 1 and 3 of fans A, C and D in the ▲ position, in which the air jet is deflected to the right to cause a reaction force to the left, and by adjusting the positions of flaps 1 and 3 of fan B in the ▼ position, which pushes the air jet to the left, creating a reaction force to the right. The combination of the forces to the left acting below the center of mass and the forces to the right acting above the center of mass produces a moment tending to cause the desired roll to the right.

Pitch attitudes may also be produced. PITCH DOWN may be accomplished by adjusting flaps 2 and 4 of fans A, C and D to the ◄position, and flaps 2 and 4 of fan B to the ►position, which causes flaps 2 and 4 of fans A, C and D to redirect the air jet forward, resulting in a reaction force directed rearward, and causes flaps 2 and 4 of fan B to redirect the air jet rearward, resulting in a forward-directed reaction force. The combination of the force to the rear acting below the center of mass and the force in the forward direction acting above the center of mass causes the desired pitch down attitude. Similarly, a PITCH UP attitude can be achieved, from FIG. 6d, by directing flaps 2 and 4 of fans A, C and D to the ►position, and flaps 2 and 4 of fan B to the ◄position.

Lift negation is performed by controlling the positions of flaps 5, 6, 7 and 8 of the fans, preferably simultaneously, in the range between the neutral position and the positions illustrated in FIG. 6b. As mentioned, the air jet is deflected in mutually countervailing directions, with the result that the magnitude of the downward-directed component of the air jet may be varied, and its lift may also be varied as a consequence.

The various flaps may be adjusted to their desired positions during flight by conventional aircraft actuator cables running from controls within the cab, over idler pulleys as necessary, to actuating pulleys such as those illustrated in FIGS. 3a and 4a. Reference to the tabulations of FIG. 6d shows that the actuation of flaps is performed in pairs, in that flaps 2 and 4 always move together or in the same direction.

Figure 7:
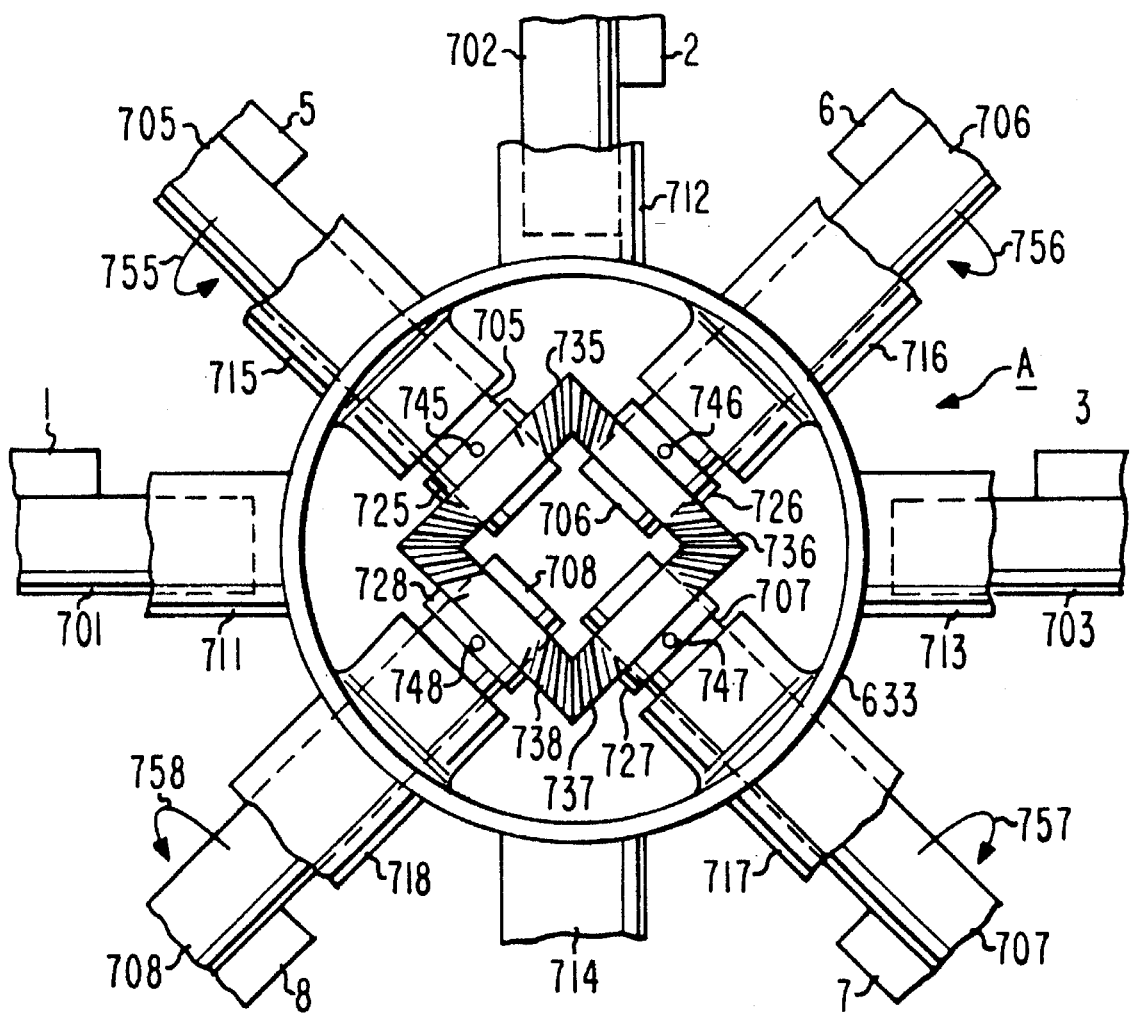
FIG. 7 is an axial or plan view of a portion of the center support of the flaps of a representative shrouded fan, illustrating the gearing for causing lift negation flaps to act in concert.

In FIG. 7, the central support region for the vanes of one shrouded fan are seen in axial or plan view. For definiteness, the particular fan is forward fan A of FIG. 6c. Elements of FIG. 7 corresponding to those of other FIGURES are designated by like reference numerals. In FIG. 7, movable flaps 1–8 are each mounted on a shaft 701–708, respectively, for rotation thereon. Each shaft is supported near housing 633 by a corresponding bushing or bearing 711–718, respectively, which in turn are supported by the housing or associated structure. As illustrated, bearings 711–714 are blind, in that the corresponding shafts do not pass all the way therethrough. Bearings 715–718, however, allow the corresponding shafts to protrude into the interior of housing 633. More particularly, shaft 705, which supports movable lift negation flap 5, extends through bearing 715, and is attached to the flange 725 of a beveled spur gear 735 by a fixation pin 745. Similarly, shaft 706, which supports movable lift negation flap 6, extends through bearing 716, and is attached to flange 726 of a beveled gear 736 by a pin 746. The other two shafts 707, 708 are similarly attached to beveled gears 737, 738. Gears 735–738 are of the same size and mutually engaged, with gear 735 engaging gears 736 and 738, and with gear 737 also engaging gears 736 and 738, but not engaging gear 735 directly. The gears are arranged in a relationship which results in mutual rotation of the gears when any one of the four shafts 705–708 is rotated. For rotation of shaft 705 in the direction of arrow 755, arrows 756, 757, and 758 indicate the corresponding direction of rotation of shafts 706, 707, and 708, respectively. The relative directions of arrows 755–758 are such that lift negation flaps 5–8 rotate in what may be viewed as pairs 5,6 and 7,8, which move toward each other. They may also be viewed as pairs 5,8 and 6,7 which move away from each other. Whatever view if taken, the lift negation flaps when mutually coupled as illustrated in FIG. 7 tends to change the amount of lift attributable to the air jet, without introducing net rotational forces. Further, it is clear that rotation of only one of the shafts of the lift negation flaps will result in rotation of the others.

Figure 8A:
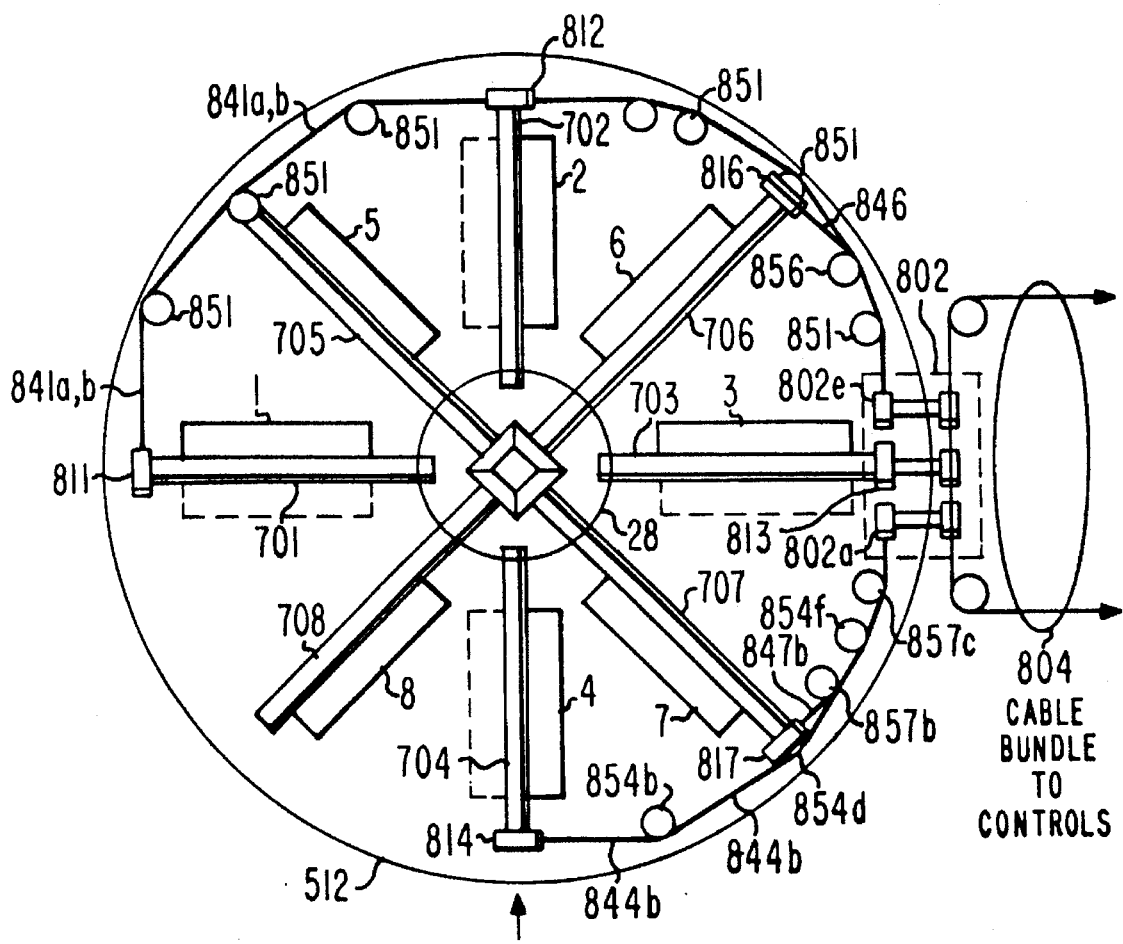
FIG. 8a is a simplified plan view of the flap control cable routing for a shrouded fan.
Figure 8B:
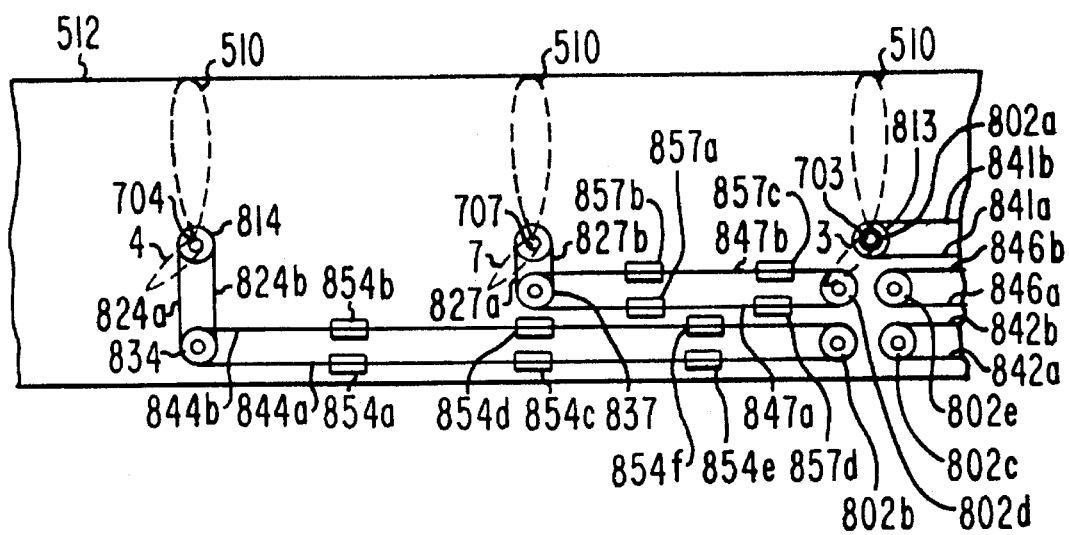
FIG. 8b is a simplified elevation view, developed from FIG. 8a, showing the routing of the control cables at different axial and rotational positions about the shroud.

FIG. 8a illustrates the control cable routing about a typical shrouded fan, and FIG. 8b is a side elevation view developed from FIG. 8a, showing the structure conceptually opened and laid out flat. In FIG. 8a, the flaps and flap actuation and support shafts are designated by the same numerals as in FIG. 7. In FIGS. 8a and 8b, each actuation and support shaft 701–707 is seen to terminate in a control cable pulley 811–817. More specifically, shafts 703 and 704, which actuate and support directional control flaps 3 and 4, terminate in pulleys 813 and 814, respectively, and shaft 707, which supports and actuates lift negation flap 7, terminates in a control cable pulley 817. As can be seen best in FIG. 8a, the control cable "bundle" for control of the flaps of the shrouded fan of FIG. 8a enters from the right, adjacent to shaft 703. Shaft 703 can therefore be actuated directly from a shaft of a cable direction transfer block designated generally as 802. Shaft 704 is rotationally actuated by cables 824a and 824b which run over pulley 814. Cables 824a and 824b, in turn, are actuated by a direction-changing idler pulley arrangement 834, and pulley arrangement 834 in turn is actuated by cables 844a and 844b, which run over idler pulleys 854a, b, c, d, e and f to a pulley 802b of direction transfer block 802. A corresponding cable pair 842a and 842b leaves transfer block 802 and proceeds over a set of idler pulleys corresponding to pulleys 854, to pulley 834 for ultimately actuating actuation and support shaft 702 of flap 2, whereby flaps 2 and 4 are controlled together, as described above in relation to FIGS. 6a–6d.

Also in FIGS. 8a and 8b, lift negation flap 7 is supported and actuated by shaft 707, which terminates in a pulley 817. Pulley 817 is actuated by a cable pair 827a, 827b, and which run to a direction-changing idler pulley arrangement 837, and pulley arrangement 837 in turn is actuated by cables 847a and 847b. Cables 847a and 847b run over idler pulleys 857a, b, c and d to a pulley 802d of transfer block 802, which is ultimately controlled by a cable pair of cable bundle 804. A corresponding pair of cables 846a, 846b, actuated by pulley 802e of transfer block 802, runs over a set of idler pulleys 856, corresponding to idler pulleys 857 associated with lift negation flap 807, to a pulley 816 associated with actuation and support shaft 706, to thereby actuate lift negation flap 6 simultaneously with flap 7. As mentioned above in conjunction with FIG. 7, actuation of even a single one of the four lift negation flaps results in actuation of them all. For symmetry and redundancy, control is applied to two of the four lift negation shafts. A further set of control cables 841*a*, 841*b* runs from pulley 813, associated with transfer block 802, over idler pulleys 851 to ultimately control actuation shaft 701 by means of a pulley 811. Thus, each of the four direction control flaps are controlled in pairs 1,3 and 2,4, and the four lift control flaps are controlled in mutual synchrony.

The control cables of bundle 804 of the representative shrouded fan of FIGS. 8*a* and 8*b* are routed, together with the corresponding control cable bundles of the other shrouded fans, to common operator-controlled levers or actuators within the cab. The routing of cable bundles through the body of the vehicle to the various shrouded fans is believed to be well within the ordinary skill in the art. Operation of the vehicle may be simplified by grouping the control cables in conventional arrangements for ganging similar operations for simultaneous actuation by a single lever or actuator. For example, all of the lift negation cable pairs from the four shrouded fans may be ganged together, so that a single lever actuates all the flaps simultaneously for increasing or decreasing lift. The ganging may be performed mechanically, by hydraulic or electronically controlled electrical actuators, all in known fashion.

Since the vehicle is to be used for surface travel in the same manner as a conventional automobile, it is desirable that some of the control actuators correspond to those ordinarily used for surface vehicles, such as a steering wheel, brake and accelerator pedals. The steering wheel (not illustrated) may be connected to a conventional steering box, coupled to the front wheels by control rods. The accelerator would be coupled for controlling engine speed in terrestrial mode, and the brake pedal, of course, to the brakes (not illustrated) associated with the wheels. Also, to reduce excess weight and volume, the steering wheel, and the brake and accelerator pedals, should serve functions during flight. Thus, in flight, the steering wheel could be coupled for to the flaps according FIG. 6*d* for inducing a left or right band attitude in response to turning the wheel left or right, respectively. Similarly, the accelerator pedal could be coupled for translation forward and aft, rather than for changing engine speed. In addition to the abovementioned three control actuators, additional control actuators will be necessary for manipulating the cables in a manner appropriate to the various additional motions available in the airborne mode of operation. One possible arrangement uses a total of five foot pedals, a large and a small lever, and a steering wheel, with the steering wheel coupled as described above for banking, with a larger of the levers connected for lift negation, for thereby controlling vertical motion, and with the smaller lever coupled for pitch up and down. Among the five foot pedals, the right-most controls forward and rearward translation in the airborne mode, and acts as an accelerator in ground mode. Among the other four, the one on the far left, when depressed, rotates the craft to the left, and the right-most (second from the right) rotates it to the right when depressed. The remaining two foot pedals, namely the second and third from the left, translate the craft to the left and right, respectively, when depressed.

Figure 9:
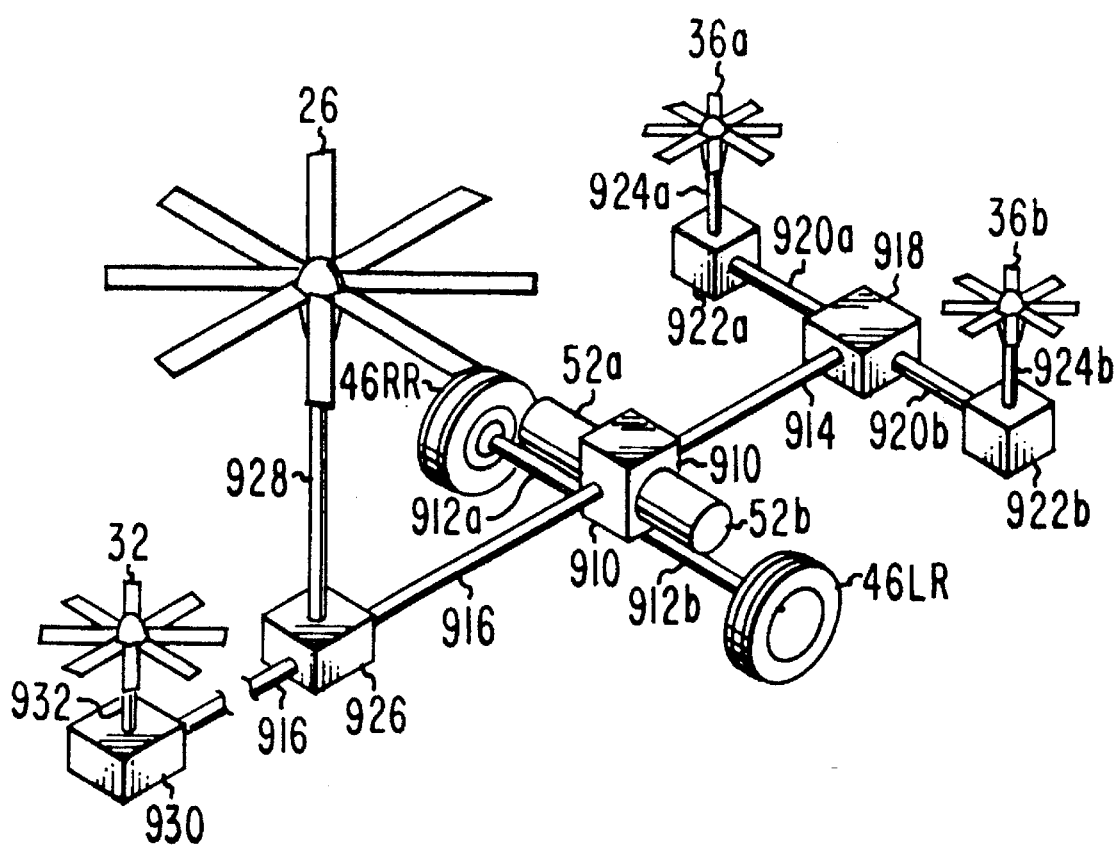
FIG. 9 is a perspective or isometric view of the engine, transmission and gear drive of the vehicle, separate from the remainder of the vehicle.

As mentioned above, the engine complement selected for the described embodiment of the invention includes a pair of General Electric POWERCORE engines, which are rotary engines designed to burn heavy fuels such as JP5, JP8, and diesel fuels. A desirable engine is a two-rotor, 750 cc per rotor, 175 HP at 7000 RPM version, with a specific fuel consumption of 0.5 lb/HP-hr. Each of these engines weighs 95 lb in the absence of accessories. This particular engine is designed for liquid cooling, although air cooling would be preferred. Referring to FIG. 9, General Electric Powercore engines 52*a* and 52*b* are coupled to a transaxle arrangement 910, which is coupled to axles 912*a* and 912*b* for driving wheels 46RR and 46LR, respectively, in the terrestrial mode of operation. For the flight mode of operation, engines 52*a* and 52*b* are coupled by transaxle 910 to a rear longitudinal drive shaft 914 and a forward longitudinal drive shaft 916. Rear drive shaft 914 couples power to the two eight-bladed aft fans 36*a* and 36*b* by way of a rear center gearbox 918, rear lateral shafts 920*a* and 920*b*, rear aright-angle gearboxes 922*a* and 922*b*, and vertical fan shafts 924*a* and 924*b*. Also in FIG. 9, forward longitudinal drive shaft 916 couples power to a right-angle speed reducing gearbox 926, which couples power to vertical fan shaft 928 and to eight-bladed upper fan 26. Forward longitudinal drive shaft 916 also couples power to forward fan 32 by way of a forward right-angle gearbox 930 and a vertical fan shaft 932. It will be appreciated that the gear ratios are controlled as described above to achieve the cancellation of rotational momentum.

Figure 10:
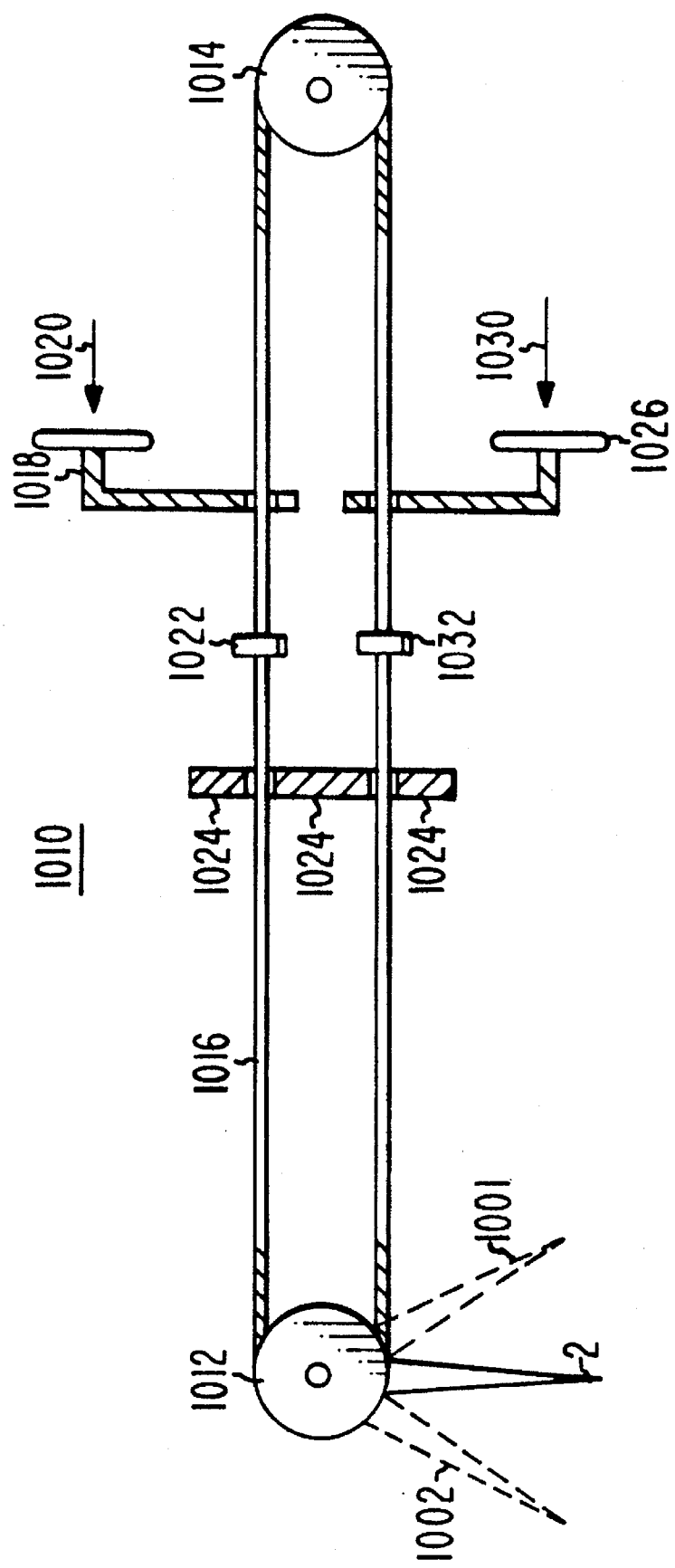
FIG. 10 is a simplified schematic diagram of an arrangement for actuating flaps in different directions in response to depressing different mechanical controls.

FIG. 10 is a simplified schematic diagram of a scheme for actuating flaps according to two different regimes in response to actuation of two different mechanical controls. In FIG. 10, apparatus 1010 includes a first pulley 1012 fixedly coupled to a movable vane 2, illustrated in the neutral position. A second pulley 1014 coacts with pulley 1012, and with an actuating cable 1016 to allow rotation of the pulleys in response to movement of the cable. A first foot pedal 1018, which may be imagined as being, for example, the forward-translation pedal, defines a clearance aperture which fits over cable 1016, so that motion of pedal 1018 in the direction of arrow 1020 has no initial effect, until the motion carries the aperture into contact with a knob 1022 affixed to the cable. Since knob 1022 is larger than the aperture in pedal 1018, further motion of pedal 1018 in the direction of arrow 1020 after contact is made causes the cable bearing knob 1022 to move to the left, thereby rotating pulley 1012, causing flap 2 to move toward position 1001. Motion continues as pedal 1018 is depressed, until knob 1022 contacts fixed stop 1024, which sets the limit of flap motion. Similarly, pedal 1026, which may be considered to be, for example, a pedal which causes rotation of the vehicle, is arranged for movement in the direction of arrow 1030. When pedal 1026 is depressed, no motion of the flap occurs until the pedal contacts knob 1032, whereupon motion of knob 1032 to the left begins. As the pedal is further depressed, knob 1032 translates further to the left, thereby rotating pulley 1012 counterclockwise, and causing movable flap 2 to move to position 1002. Motion stops when knob 1032 reaches fixed stop 1024.

Figure 11:
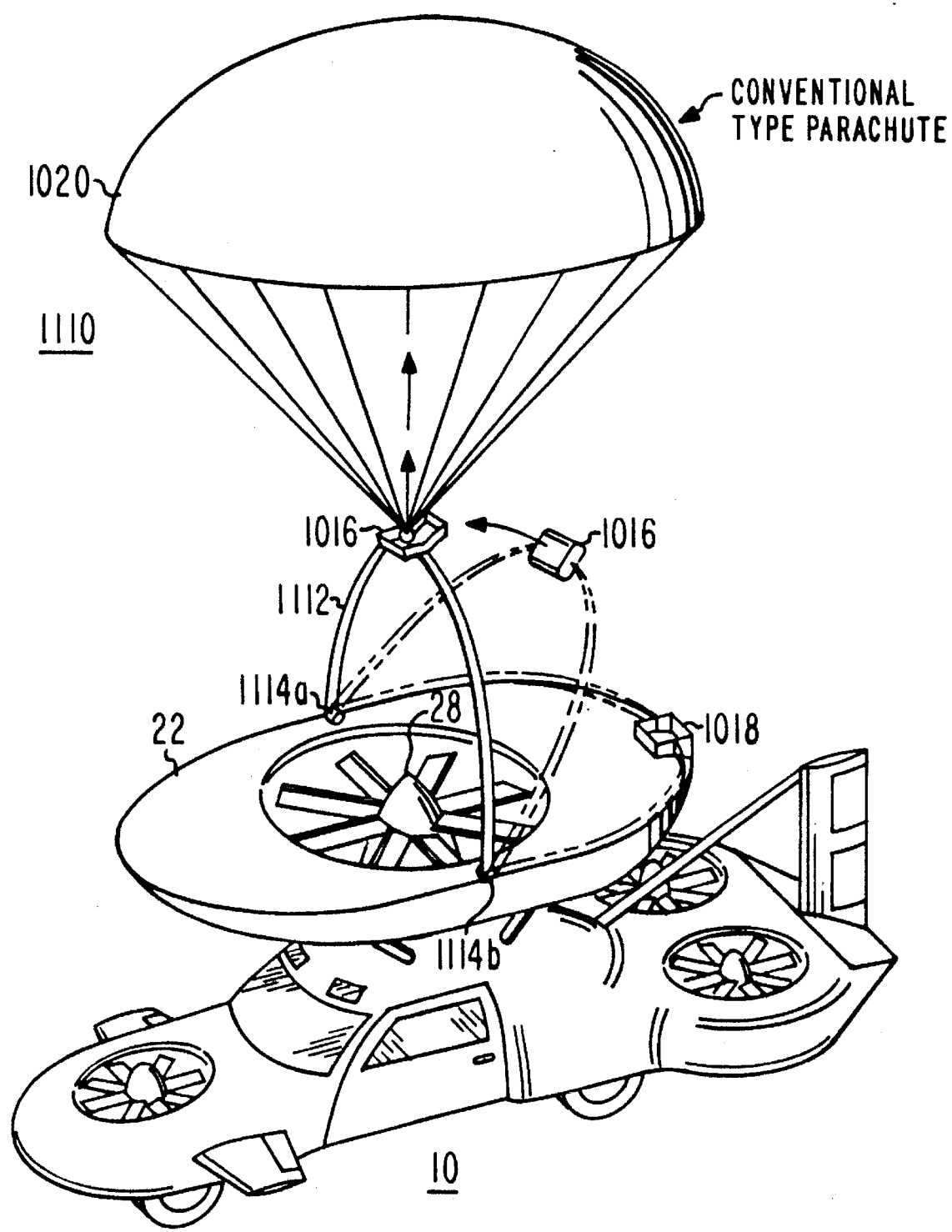
FIG. 11 is a perspective or isometric view of a vehicle according to an aspect of the invention, in which a parachute carried in the upper shroud may be deployed.

For reasons of safety, the vehicle may be equipped with one or more parachutes. FIG. 11 illustrates a scheme by way which a single large parachute may be stored and deployed. In FIG. 11, vehicle 10 includes a parachute arrangement 1110, which, in a stowed condition, includes a parachute, illustrated deployed as 1020, normally stowed in a parachute container 1016, which is normally stored in a parachute cavity 1018 in shroud 22 of upper fan 20. Parachute cavity 1018 is aft of center of mass CG, and if the parachute were to have its shroud lines attached to fan shroud 22 adjacent to cavity 1018, the vehicle would adopt a pitch-down attitude when supported by the deployed parachute. The attitude can be controlled during parachute descent by connecting the parachute container 1016 to the center portion of a curved member 1112, illustrated in two different positions. Curved member 1012 is supported at the sides of shroud 22, in roughly the same transverse y–z plane as center of mass CG, by hinge pins 1114a and 1114b, so that the curved member may lie flat against the upper surface of the rear portion of shroud 22 when not deployed. When released from the stowed position, curved member is rotated about hinge pins 1114a and 1114b by a spring arrangement (not illustrated), toward the fully deployed position illustrated in solid lines. When the container is clear of the shroud structure, deployment of the parachute may begin. The partially deployed parachute will provide a force tending to pull curved member 1112 into the fully deployed position.

As described above, the throttling vanes allow the thrust of derived from the air jet of a ducted fan to be reduced below the maximum value. If all the vanes are throttled simultaneously, as might occur if rapid descent were desired, the throttling would result in reduction of the load presented by each fan to the engine, which might result in a tendency to increase engine RPM, which in turn tends to increase fan RPM. The increase in fan RPM tends to offset or negate the effect of throttling. This is an undesirable effect, since the dynamics of the system tend to counter the commanded action. This undesirable effect may be reduced by continuous engine speed control, whereby the RPM-changing effects of load tend to be minimized. Operator control of the engine speed is accomplished by selecting the set-point of the engine speed controller, in well-known fashion.

Other embodiments of the invention will be apparent to those skilled in the art. In particular, any type of engine may be used to power the air-land vehicle, and the coupling between the engine or engines may be by way of hydraulic or electrical coupling, rather than by way of shafts as described. Similarly, the control of the movable flaps may be by means other than cables, as for example shafts, electrical or other actuators. The described embodiment has power only to the rear wheels, but can readily be adapted for four-wheel drive in any conventional manner. While eight-bladed fans have been described, any number of blades may be used. While locations relative to the center of mass have been specified, the location of the center of mass will depend upon the payload, and upon the locations and masses of consumables; thus, locations which are indicated as being in particular locations relative to the center of mass art to be understood as being near those locations, as is well known to those skilled in the art.

What is claimed is:

1. An air-land vehicle, comprising:
   a load-bearing body supporting an engine, said body defining a longitudinal axis parallel to a preferred direction of travel, said body, engine, and load together defining a center of mass, and said preferred direction of travel, said longitudinal axis and said center of mass together defining forward and rearward portions of said body relative to said center of mass, and right and left sides of said body being defined by a vertical plane containing said longitudinal axis;
   a set including at least four shrouded fans, each of said shrouded fans being coupled to said body for, when driven, producing an air jet for providing lift to said body, said shrouded fans of said set being located on said body so that at least one of said shrouded fans of said set lies above said center of mass and the remainder of said shrouded fans of said set lie below said center of mass, and so that at least one of said shrouded fans lying below said center of mass lies in said forward portion of said body and the remainder of said shrouded fans lying below said center of mass lie in said rearward portion of said body, and so that at least one of said shrouded fans lying below said center of mass lies in said right side of said body at a particular longitudinal position and another one lies in said left side of said body at said particular longitudinal position;
   drive coupling means coupled to said engine and to said set of shrouded fans, for, in a flying mode of operation, driving each of said shrouded fans at rates of revolution which are in a fixed ratio to the rates of revolution of the others of said shrouded fans, with the rotation direction of at least one of said shrouded fans being contrary to the directions of rotation of the remaining ones of said shrouded fans, and with said rate of revolution of each of said shrouded fans being selected in conjunction with its rotational inertia and with said rate of revolution and the rotational inertia of the others of said shrouded fans, to cancel the sum of a product, wherein said product is the product of said inertia of a shrouded fan multiplied by its rotational speed, and said sum is the sum of said products for all said plurality of shrouded fans in said set, whereby the angular momentum produced by said shrouded fans in one rotational direction are substantially canceled by the angular momentum produced in the opposite rotational direction;
   controllable flap means coupled to each of said shrouded fans, for controllably redirecting said air jet of the associated one of said shrouded fans, for, in said flying mode of operation, providing independent thrust direction control for at least some of said shrouded fans in at least forward and aft, and left and right directions, whereby said body attitude can be controlled in pitch and roll, and whereby said body can be subject to translational forces in forward and aft, and left and right directions; and
   a plurality of support wheels, at least one of which is controllably coupled to said engine for being driven thereby in a terrestrial mode of operation, and at least one of which is controllable for steering of said vehicle in said terrestrial mode of operation.

2. A vehicle according to claim 1, wherein said controllable flap means associated with some of said plurality of shrouded fans of said set of shrouded fans are configured for redirecting said air jet in a manner which generates rotational forces on said body, whereby motion of said body may additionally be controlled in a rotational manner.

3. A vehicle according to claim 1, wherein said plurality of shrouded fans includes first, second, third and fourth shrouded fans, and wherein said first shrouded fan lies above said center of mass and centered on said vertical plane, said second shrouded fan lies in said forward portion of said body, below said center of mass, and centered on said vertical plane, and said third and fourth shrouded fans lie in said rearward portion of said body, below said center of mass, and on the right and left sides, respectively, of said body.

4. A vehicle according to claim 1, wherein at least one of said shrouded fans is associated with at least one pair of lift negation flaps, which lift negation flaps are ganged together for common actuation, for changing the lift of the associated shrouded fan by affecting the airflow therethrough at given rotational speed, whereby the lift of said vehicle may be controlled without throttle change of said engine.

5. A vehicle according to claim 4, wherein each of said shrouded fans is associated with two pairs of lift negation flaps.

6. A vehicle according to claim 1, further comprising fixed vanes associated with each of said shrouded fans, upstream in the airflow from the associated controllable flap means, for generating a smooth airflow at the locations of said flap means.

7. A vehicle according to claim 1, wherein each of said plurality of shrouded fans of said set of shrouded fans includes two sets of said controllable flap means for redirecting said air jet, and two sets of lift negation flaps, which lift negation flaps of each of said sets are ganged together for common actuation, for changing the lift of the associated shrouded fan by affecting the airflow therethrough at given rotational speed of said shrouded fan, whereby the lift of said vehicle may be controlled without throttle change of said engine by control of said lift negation flaps, and said body can be controlled in pitch and roll attitude, and can be controlled for translational forces.

8. A vehicle according to claim 1, wherein said controllable flap means of said remainder of said shrouded fans of said set which lie below said center of mass may be controlled to vary the thrust direction thereof in the forward and aft directions, and said controllable flap means of said shrouded fans lying above said center of mass may be simultaneously controlled to vary the thrust direction thereof in the aft and forward directions, respectively, for pitch forward and pitch rearward control, respectively, of said body.

9. A land-air vehicle adapted for carrying a load, said vehicle comprising:

an engine;

a body supporting said engine, said body being elongated about a longitudinal axis, said load, said engine and said body together defining a center of mass, said longitudinal axis and said center of mass together defining forward and rearward portions of said body relative to said center of mass, and right and left sides of said body being defined by a vertical plane containing said longitudinal axis;

first, second and third sets of shrouded fans affixed to said body, said first set of shrouded fans providing lift centered over said center of mass, said first set of shrouded fans including at least a first shrouded fan located above a horizontal plane including said center of mass, said second set of shrouded fans providing lift which is centered (a) in said vertical plane containing said longitudinal axis, and (b) in one of said forward and rearward portions of said body, said third set of shrouded fans providing lift centered (a) in said vertical plane containing said longitudinal axis, and (b) in the other one of said forward and rearward portions of said body, one of said second and third sets of shrouded fans comprising two similarly dimensioned shrouded fans symmetrically disposed to the left and to the right of said vertical plane containing said longitudinal axis, to provide net lift which is centered on said longitudinal axis;

drive coupling means coupled to said engine and to said plurality of shrouded fans, for, in a flying mode of operation, driving each of said fans at rates of revolution which are in a fixed ratio to the rates of revolution of the others of said fans, with the rotation direction of at least one of said fans being contrary to the directions of rotation of the remaining ones of said fans, and with said ratio of said rate of revolution of each of said fans being selected in conjunction with its rotational inertia to cancel the angular momentum produced by said fans in one rotational direction by the angular momentum moments produced in the opposite rotational direction;

controllable flap means coupled to each of said shrouded fans, for controllably redirecting the air jet created by the associated one of said shrouded fans, for, in said flying mode of operation, providing independent thrust direction control for at least some of said shrouded fans in at least forward and aft, and left and right directions, whereby said body attitude can be controlled in pitch and roll, and whereby said body can be subject to translational forces in forward and aft, and left and right directions; and a plurality of support wheels, at least one of which is controllably coupled to said engine for being driven thereby in a terrestrial mode of operation, and at least one of which is controllable for steering of said vehicle in said terrestrial mode of operation.

10. A vehicle according to claim 1, wherein said drive coupling means comprises at least one gearbox coupled to said engine, and drive shaft means coupling said fans with said engine and gearbox.

11. A vehicle according to claim 1, further comprising a parachute which, when stowed, is located in said shroud of one of said shrouded fans.

12. A vehicle according to claim 11, wherein said parachute, when stowed, is centered on said vertical plane, at a location remote from said center of gravity, and further comprising:

movable parachute coupling means coupled to said parachute, and hingedly coupled to said fan shroud at a transverse plane, orthogonal to said longitudinal axis, which is located adjacent said center of mass.

13. A vehicle according to claim 1, wherein the maximum width of said vehicle is no greater than eight feet.

14. A multifunction vehicle adapted for use carrying a load on highways and in flight, comprising:

a body supporting an engine, said body defining a longitudinal axis parallel to a preferred direction of travel, said body, engine, and load together defining a center of mass, and said preferred direction of travel, said longitudinal axis and said center of mass together defining forward and rearward portions of said body relative to said center of mass;

a first shrouded fan coupled to said body for, in a first mode of operation, producing an air jet, for providing lift to said body, the center of said lift of said first shrouded fan lying above said center of mass in a body-bisecting vertical plane which includes said longitudinal axis, and in the same plane transverse to said longitudinal axis as said center of mass, said first shrouded fan having a fan diameter of less than eight feet;

a second shrouded fan coupled to said body for, in said first mode of operation, producing an air jet for providing lift to said body, the center of said lift of said second shrouded fan being located below said center of mass and in said body-bisecting plane, at a longitudinal position which is one of said forward and said rearward of said center of mass, said second shrouded fan having a diameter less than that of said first shrouded fan;

third and fourth shrouded fans coupled to said body for, in said first mode of operation, producing air jets for providing lift to said body, said third and fourth shrouded fans being symmetrically disposed relative to said vertical plane, and the combined center of lift of said third and fourth shrouded fans being located in said vertical plane at a longitudinal position which is the other one of said forward and rearward of said center of mass, said third and fourth shrouded fans having equal diameters, each of which diameters is no greater than half said diameter of said first shrouded fan;

drive coupling means coupled to said engine and to said first, second, third and fourth shrouded fans, for, in said first mode of operation, driving said first, second, third and fourth shrouded fans at rates of revolution which are in a mutually fixed ratio, with the rotation direction of said first shrouded fan contrary to the directions of rotation of said second, third and fourth shrouded fans, said ratio being selected to substantially cancel the moments produced in one rotational direction by said first shrouded fan by the moments produced by the combination of said second, third and fourth shrouded fans;

first, second, third and fourth controllable vane means coupled to said first, second, third and fourth shrouded fans, respectively, for controllably redirecting said air jet of the corresponding one of said shrouded fans, for, in said first mode of operation, providing thrust control in at least forward and lateral directions; and a plurality of support wheels, at least one of which is controllably coupled to said engine for being driven thereby in a second mode of operation, and one of which is controllable for steering of said vehicle in said second mode of operation.

15. A vehicle according to claim 14, wherein said second shrouded fan is located at a longitudinal position which is forward of said center of mass, and said third and fourth shrouded fans are located rearward of said center of mass.

16. A vehicle according to claim 14, wherein at least some of said shrouded fans include pairs of coacting movable lift negation flaps, arranged, when actuated, for controllably tending to open up or close off a portion of said shrouded fan for increasing or reducing, respectively, the lift supplied by the corresponding air jet, without a net redirection of said air jet, which tends to create a translational or rotational force on said vehicle.

* * * * *